United States Patent
Wu et al.

(10) Patent No.: US 7,269,289 B2
(45) Date of Patent: *Sep. 11, 2007

(54) SYSTEM AND METHOD FOR ROBUST VIDEO CODING USING PROGRESSIVE FINE-GRANULARITY SCALABLE (PFGS) CODING

(75) Inventors: Feng Wu, Beijing (CN); Shipeng Li, Redmond, WA (US); Ya-Qin Zhang, West Windsor, NJ (US)

(73) Assignee: Microsoft Corporation, Redmond, WA (US)

( * ) Notice: Subject to any disclaimer, the term of this patent is extended or adjusted under 35 U.S.C. 154(b) by 264 days.

This patent is subject to a terminal disclaimer.

(21) Appl. No.: 11/120,244

(22) Filed: May 2, 2005

(65) Prior Publication Data

US 2005/0190834 A1    Sep. 1, 2005

Related U.S. Application Data (63) Continuation of application No. 10/612,441, filed on Jul. 2, 2003, now Pat. No. 6,956,972, which is a continuation of application No. 09/454,489, filed on Dec. 3, 1999, now Pat. No. 6,614,936.

(51) Int. Cl.
*G06K 9/36* (2006.01)
(52) U.S. Cl. .................................... 382/238
(58) Field of Classification Search ............ 382/232, 382/236, 238, 248, 250; 348/584.1, 374.1, 348/395.1, 400.1–404.1, 407.1–409.1, 410.1–416.1, 348/430.1, 431.1; 375/240.12, 240.15, 240.16, 375/240.18, 240.2
See application file for complete search history.

(56) References Cited

U.S. PATENT DOCUMENTS

| | | | |
|---|---|---|---|
| 5,418,571 | A | 5/1995 | Ghanbari |
| 5,852,565 | A | 12/1998 | Demos |
| 6,072,831 | A | 6/2000 | Chen |
| 6,128,041 | A | 10/2000 | Han et al. |
| 6,172,672 | B1 | 1/2001 | Ramasubramanian et al. |
| 6,173,013 | B1 | 1/2001 | Suzuki et al. |
| 6,212,208 | B1 | 4/2001 | Yoneda |
| 6,263,022 | B1 | 7/2001 | Chen et al. |

(Continued)

FOREIGN PATENT DOCUMENTS

WO    WO99/33274    7/1999

(Continued)

OTHER PUBLICATIONS

Wu et al., "DCT-Prediction Based Progressive Fine Granularity Scalable Coding", Sep. 10-13, 2000, pp. 556-559.

(Continued)

*Primary Examiner*—Jose L. Couso
(74) *Attorney, Agent, or Firm*—Lee & Hayes, PLLC (57) ABSTRACT

A video encoding scheme employs progressive fine-granularity layered coding to encode video data frames into multiple layers, including a base layer of comparatively low quality video and multiple enhancement layers of increasingly higher quality video. Some of the enhancement layers in a current frame are predicted from at least one lower quality layer in a reference frame, whereby the lower quality layer is not necessarily the base layer.

15 Claims, 9 Drawing Sheets

U.S. PATENT DOCUMENTS

| | | | |
|---|---|---|---|
| 6,275,531 B1 | 8/2001 | Li | |
| 6,292,512 B1 | 9/2001 | Radha et al. | |
| 6,330,280 B1 | 12/2001 | Suzuki et al. | |
| 6,343,098 B1 | 1/2002 | Boyce | |
| 6,363,119 B1 | 3/2002 | Oami | |
| 6,377,309 B1 | 4/2002 | Ito et al. | |
| 6,392,705 B1 | 5/2002 | Chaddha | |
| 6,480,547 B1 | 11/2002 | Chen et al. | |
| 6,490,705 B1 | 12/2002 | Boyce | |
| 6,496,980 B1 | 12/2002 | Tillman et al. | |
| 6,553,072 B1 | 4/2003 | Chiang et al. | |
| 6,567,427 B1 | 5/2003 | Suzuki et al. | |
| 6,614,936 B1 * | 9/2003 | Wu et al. | 382/238 |
| 6,700,933 B1 * | 3/2004 | Wu et al. | 375/240.16 |
| 6,728,317 B1 * | 4/2004 | Demos | 375/240.21 |
| 6,816,194 B2 * | 11/2004 | Zhang et al. | 375/240.27 |

FOREIGN PATENT DOCUMENTS

| | | |
|---|---|---|
| WO | WO00/05898 | 2/2000 |

OTHER PUBLICATIONS

Nakamura et al., "Scalable Coding Schemes Based on DCT and MC Prediction", Oct. 23, 1995, pp. 575-578.

"Coding of Moving Pictures and Audio," ISO/IEC JTCI/SC29/WG11 MPEG99/M5122, University of New South Wales, Oct. 1999.

"Coding of Moving Pictures and Associated Audio", ISO/IEC JTC1/SC29/Wg11 MPEG98/M4204, Dec. 1998.

"Coding of Moving Pictures and Audio", ISO/IEC/JTC1/SC29/WG11 MPEG99/M5583, Dec. 1999.

Macnicol et al., "Results on Fine Granularity Scalability", University of South Wales, Oct. 1999, 6 pages.

Li, "Fine Granularity Scalability Using Bit-Plane Coding of DCT Coefficients", Weiping Li, Optivision, Inc., Dec. 1998, 9 pages.

Li et al, "Study of a New Approach to Improve FGS Video Coding Efficiency", Microsoft Research China, Dec. 1999, 16 pages.

* cited by examiner

SYSTEM AND METHOD FOR ROBUST VIDEO CODING USING PROGRESSIVE FINE-GRANULARITY SCALABLE (PFGS) CODING

RELATED APPLICATION(S)

This is a continuation of U.S. Ser. No. 10/612,441, filed on Jul. 2, 2003, now U.S. Pat. No. 6,956,972 issued on Oct. 18, 2005, which is a continuation of U.S. Ser. No. 09/454,489, filed on Dec. 3, 1999, now U.S. Pat. No. 6,614,936 issued on Sep. 2, 2003.

TECHNICAL FIELD

This invention relates to systems and methods for coding video data, and more particularly, to motion-compensation-based video coding schemes that employ fine-granularity layered coding.

BACKGROUND

Efficient and reliable delivery of video data is becoming increasingly important as the Internet continues to grow in popularity. Video is very appealing because it offers a much richer user experience than static images and text. It is more interesting, for example, to watch a video clip of a winning touchdown or a Presidential speech than it is to read about the event in stark print. Unfortunately, video data is significantly larger than other data types commonly delivered over the Internet. As an example, one second of uncompressed video data may consume one or more Megabytes of data. Delivering such large amounts of data over error-prone networks, such as the Internet and wireless networks, presents difficult challenges in terms of both efficiency and reliability.

To promote efficient delivery, video data is typically encoded prior to delivery to reduce the amount of data actually being transferred over the network. Image quality is lost as a result of the compression, but such loss is generally tolerated as necessary to achieve acceptable transfer speeds. In some cases, the loss of quality may not even be detectable to the viewer.

Video compression is well known. One common type of video compression is a motion-compensation-based video coding scheme, which is used in such coding standards as MPEG-1, MPEG-2, MPEG-4, H.261, and H.263.

One particular type of motion-compensation-based video coding scheme is fine-granularity layered coding. Layered coding is a family of signal representation techniques in which the source information is partitioned into a sets called "layers". The layers are organized so that the lowest, or "base layer", contains the minimum information for intelligibility. The other layers, called "enhancement layers", contain additional information that incrementally improves the overall quality of the video. With layered coding, lower layers of video data are often used to predict one or more higher layers of video data.

The quality at which digital video data can be served over a network varies widely depending upon many factors, including the coding process and transmission bandwidth. "Quality of Service", or simply "QoS", is the moniker used to generally describe the various quality levels at which video can be delivered. Layered video coding schemes offer a range of QoSs that enable applications to adopt to different video qualities. For example, applications designed to handle video data sent over the Internet (e.g., multi-party video conferencing) must adapt quickly to continuously changing data rates inherent in routing data over many heterogeneous sub-networks that form the Internet. The QoS of video at each receiver must be dynamically adapted to whatever the current available bandwidth happens to be. Layered video coding is an efficient approach to this problem because it encodes a single representation of the video source to several layers that can be decoded and presented at a range of quality levels.

Apart from coding efficiency, another concern for layered coding techniques is reliability. In layered coding schemes, a hierarchical dependence exists for each of the layers. A higher layer can typically be decoded only when all of the data for lower layers is present. If information at a layer is missing, any data for higher layers is useless. In network applications, this dependency makes the layered encoding schemes very intolerant of packet loss, especially at the lowest layers. If the loss rate is high in layered streams, the video quality at the receiver is very poor.

Figure 1:
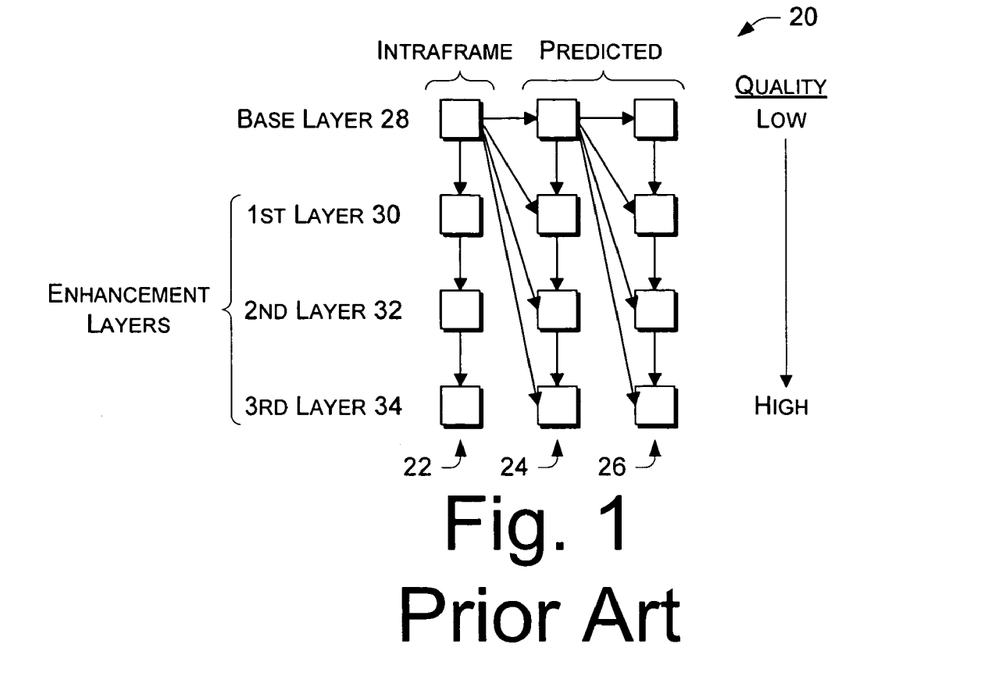
FIG. 1 is a diagrammatic illustration of a prior art layered coding scheme in which all higher quality layers can be predicted from the lowest or base quality layer.

FIG. 1 depicts a conventional layered coding scheme 20, known as "fine-granularity scalable" or "FGS". Three frames are shown, including a first or intraframe 22 followed by two predicted frames 24 and 26 that are predicted from the intraframe 22. The frames are encoded into four layers: a base layer 28, a first layer 30, a second layer 32, and a third layer 34. The base layer typically contains the video data that, when played, is minimally acceptable to a viewer. Each additional layer contains incrementally more components of the video data to enhance the base layer. The quality of video thereby improves with each additional layer. This technique is described in more detail in an article by Weiping Li, entitled "Fine Granularity Scalability Using Bit-Plane Coding of DCT Coefficients", ISO/IEC JTC1/SC29/WG11, MPEG98/M4204 (December 1998).

With layered coding, the various layers can be sent over the network as separate sub-streams, where the quality level of the video increases as each sub-stream is received and decoded. The base-layer video 28 is transmitted in a well-controlled channel to minimize error or packet-loss. In other words, the base layer is encoded to fit in the minimum channel bandwidth. The goal is to deliver and decode at least the base layer 28 to provide minimal quality video. The enhancement 30-34 layers are delivered and decoded as network conditions allow to improve the video quality (e.g., display size, resolution, frame rate, etc.). In addition, a decoder can be configured to choose and decode a particular subset of these layers to get a particular quality according to its preference and capability.

One characteristic of the illustrated FGS coding scheme is that the enhancement layers 30-34 are coded from the base layer 28 in the reference frames. As shown in FIG. 1, each of the enhancement layers 30-34 in the predicted frames 24 and 26 can be predicted from the base layer of the preceding frame. In this example, the enhancement layers of predicted frame 24 can be predicted from the base layer of intraframe 22. Similarly, the enhancement layers of predicted frame 26 can be predicted from the base layer of preceding predicted frame 24.

The FGS coding scheme provides good reliability in terms of error recovery from occasional data loss. By predicting all enhancement layers from the base layer, loss or corruption of one or more enhancement layers during transmission can be remedied by reconstructing the enhancement layers from the base layer. For instance, suppose that frame 24 experiences some error during transmission. In this case, the base layer 28 of preceding intraframe 22 can be used to predict the base layer and enhancement layers of frame 24.

Unfortunately, the FGS coding scheme has a significant drawback in that the scheme is very inefficient from a coding standpoint since the prediction is always based on the lowest quality base layer. Accordingly, there remains a need for a layered coding scheme that is efficient without sacrificing error recovery.

Figure 2:
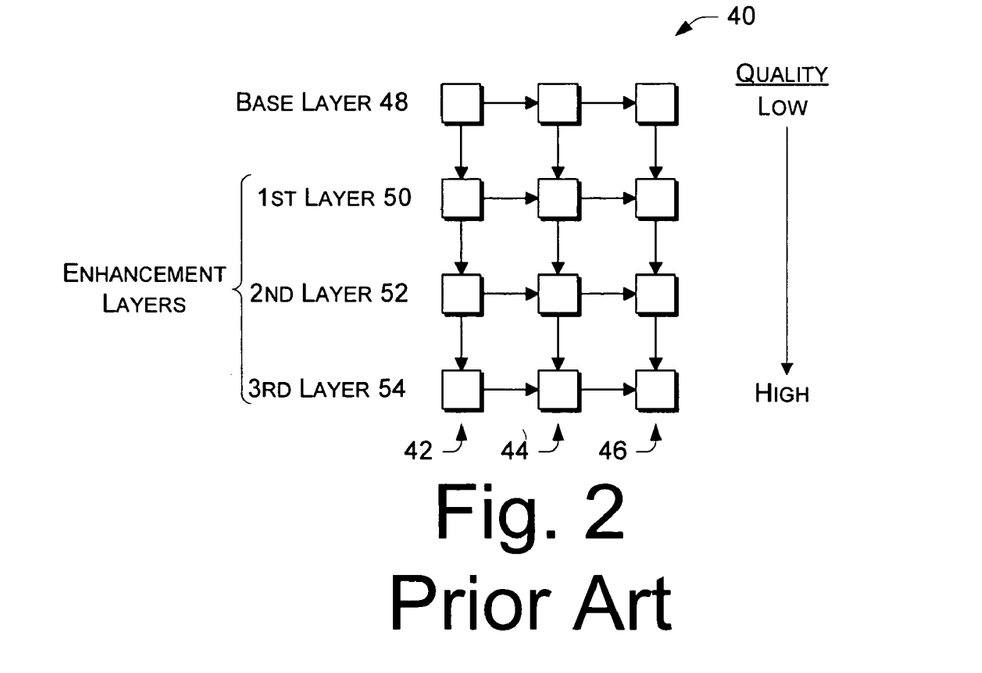
FIG. 2 is a diagrammatic illustration of a prior art layered coding scheme in which frames are predicted from their corresponding quality layer components in the intraframe or reference frame.

FIG. 2 depicts another conventional layered coding scheme 40 in which three frames are encoded using a technique introduced in an article by James Macnicol, Michael Frater and John Arnold, which is entitled, "Results on Fine Granularity Scalability", ISO/IEC JTC1/SC29/WG11, MPEG99/m5122 (October 1999). The three frames include a first frame 42, followed by two predicted frames 44 and 46 that are predicted from the first frame 42. The frames are encoded into four layers: a base layer 48, a first layer 50, a second layer 52, and a third layer 54. In this scheme, each layer in a frame is predicted from the same layer of the previous frame. For instance, the enhancement layers of predicted frame 44 can be predicted from the corresponding layer of previous frame 42. Similarly, the enhancement layers of predicted frame 46 can be predicted from the corresponding layer of previous frame 44.

The coding scheme illustrated in FIG. 2 has the advantage of being very efficient from a coding perspective. However, it suffers from a serious drawback in that it cannot easily recover from data loss. Once there is an error or packet loss in the enhancement layers, it propagates to the end of a GOP (group of predicted frames) and causes serious drifting in higher layers in the prediction frames that follow. Even though there is sufficient bandwidth available later on, the decoder is not able to recover to the highest quality until anther GOP start.

Accordingly, there remains a need for an efficient layered video coding scheme that adapts to bandwidth fluctuation and also exhibits good error recovery characteristics.

SUMMARY

A video encoding scheme employs progressive fine-granularity scalable (PFGS) layered coding to encode video data frames into multiple layers, including a base layer of comparatively low quality video and multiple enhancement layers of increasingly higher quality video. Some of the enhancement layers in a current frame are predicted from at least one lower quality layer in a reference frame, whereby the lower quality layer is not necessarily the base layer.

In one described implementation, a video encoder encodes frames of video data into multiple layers, including a base layer and multiple enhancement layers. The base layer contains minimum quality video data and the enhancement layers contain increasingly higher quality video data. The prediction of some enhancement layers in a prediction frame is based on a next lower layer of a reconstructed reference frame. More specifically, the enhancement layers of alternating frames are predicted from alternating even and odd layers of preceding reference frames. For instance, the layers of even frames are predicted from the even layers of the preceding frame. The layers of odd frames are predicted from the odd layers of the preceding frame. This alternating pattern continues throughout encoding of the video bitstream.

Many other coding schemes are possible in which a current frame is predicted from at least one lower quality layer in a reference frame, which is not necessarily the base layer. For instance, in another implementation, each of the enhancement layers in the current frame is predicted using all of the lower quality layers in the reference frame.

Another implementation of a PFGS coding scheme is given by the following conditional relationship:

$$L \bmod N = i \bmod M$$

where L designates the layer, N denotes a layer group depth, i designates the frame, and M denotes a frame group depth. Layer group depth defines how many layers may refer back to a common reference layer. Frame group depth refers to the number of frames that are grouped together for prediction purposes. If the relationship holds true, the layer L of frame i is coded based on a lower reference layer in the preceding reconstructed frame. This alternating case described above exemplifies a special case where the layer group depth N and the frame group depth M are both two.

The coding scheme maintains the advantages of coding efficiency, such as fine granularity scalability and channel adaptation, because it tries to use predictions from the same layer. Another advantage is that the coding scheme improves error recovery because lost or erroneous higher layers in a current frame may be automatically reconstructed from lower layers gradually over a few frames. Thus, there is no need to retransmit the lost/error packets.

BRIEF DESCRIPTION OF THE DRAWINGS

The same numbers are used throughout the drawings to reference like elements and features.

DETAILED DESCRIPTION

This disclosure describes a layered video coding scheme used in motion-compensation-based video coding systems and methods. The coding scheme is described in the context of delivering video data over a network, such as the Internet or a wireless network. However, the layered video coding scheme has general applicability to a wide variety of environments.

Transmitting video over the Internet or wireless channels has two major problems: bandwidth fluctuation and packet loss/error. The video coding scheme described below can adapt to the channel condition and recover gracefully from packet losses or errors.

Exemplary System Architecture

Figure 3:
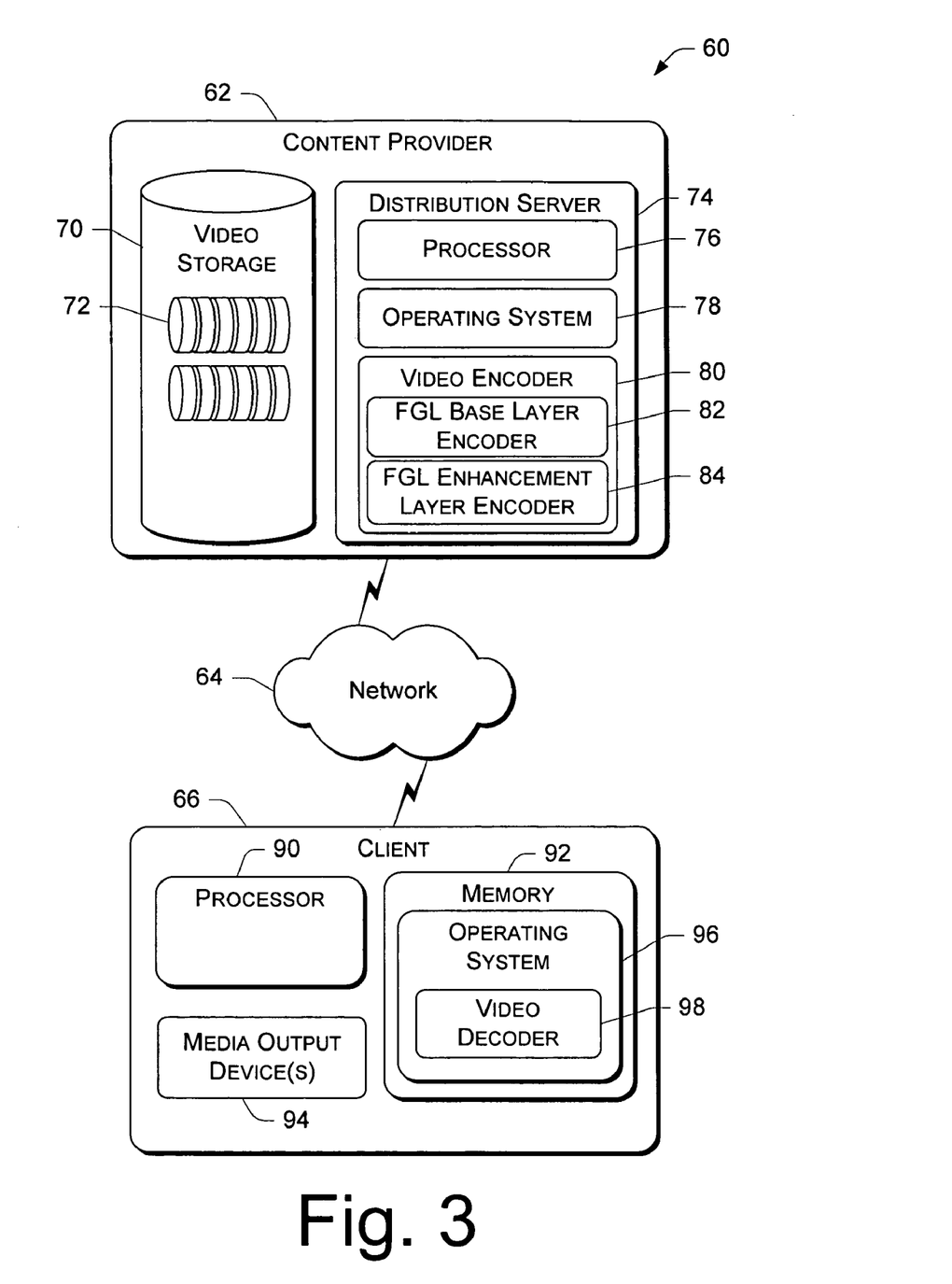
FIG. 3 is a block diagram of a video distribution system in which a content producer/provider encodes video data and transfers the encoded video data over a network to a client.

FIG. 3 shows a video distribution system 60 in which a content producer/provider 62 produces and/or distributes video over a network 64 to a client 66. The network is representative of many different types of networks, including the Internet, a LAN (local area network), a WAN (wide area network), a SAN (storage area network), and wireless networks (e.g., satellite, cellular, RF, etc.).

The content producer/provider 62 may be implemented in many ways, including as one or more server computers configured to store, process, and distribute video data. The content producer/provider 62 has a video storage 70 to store digital video files 72 and a distribution server 74 to encode the video data and distribute it over the network 64. The server 74 has a processor 76, an operating system 78 (e.g., Windows NT, Unix, etc.), and a video encoder 80. The video encoder 80 may be implemented in software, firmware, and/or hardware. The encoder is shown as a separate standalone module for discussion purposes, but may be constructed as part of the processor 76 or incorporated into operating system 78 or other applications (not shown).

The video encoder 80 encodes the video data 72 using a motion-compensation-based coding scheme. More specifically, the encoder 80 employs a progressive fine-granularity scalable (PFGS) layered coding scheme. The video encoder 80 encodes the video into multiple layers, including a base layer and one or more enhancement layers. "Fine-granularity" coding means that the difference between any two layers, even if small, can be used by the decoder to improve the image quality. Fine-granularity layered video coding makes sure that the prediction of a next video frame from a lower layer of the current video frame is good enough to keep the efficiency of the overall video coding.

The video encoder 80 has a base layer encoding component 82 to encode the video data into the base layer and an enhancement layer encoding component 84 to encode the video data into one or more enhancement layers. The video encoder encodes the video data such that some of the enhancement layers in a current frame are predicted from at least one lower quality layer in a reference frame, whereby the lower quality layer is not necessarily the base layer. The video encoder 80 is described below in more detail with reference to FIG. 9.

The client 66 is equipped with a processor 90, a memory 92, and one or more media output devices 94. The memory 92 stores an operating system 96 (e.g., a Windows-brand operating system) that executes on the processor 90. The operating system 96 implements a client-side video decoder 98 to decode the layered video streams into the original video. In the event data is lost, the decoder 98 is capable of reconstructing the missing portions of the video from frames that are successfully transferred. Following decoding, the client plays the video via the media output devices 94. The client 26 may be embodied in many different ways, including a computer, a handheld entertainment device, a set-top box, a television, and so forth.

Exemplary PFGS Layered Coding Scheme

Figure 4:
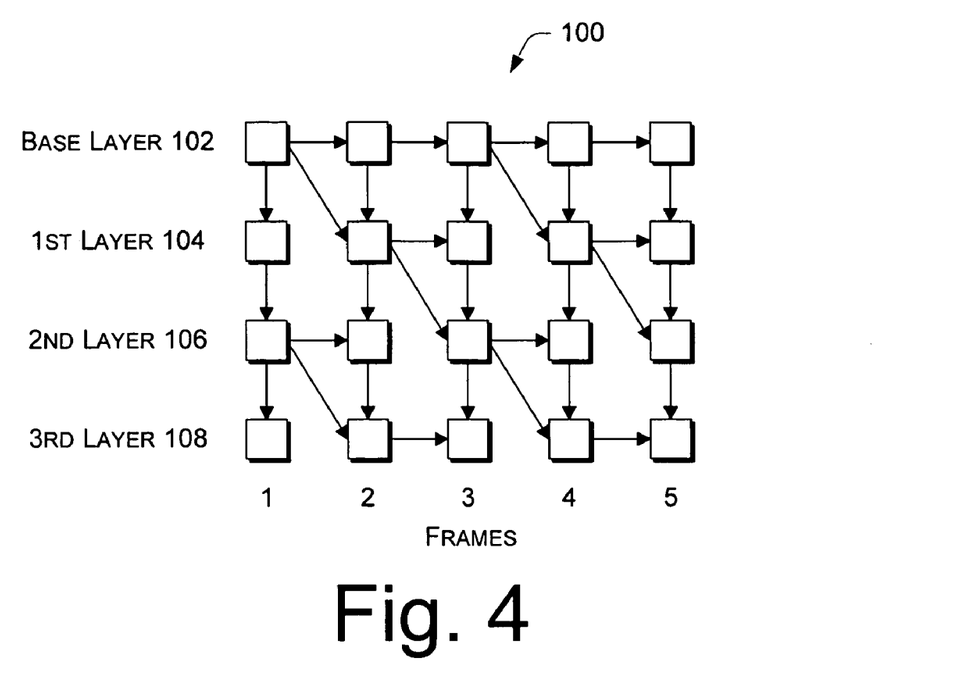
FIG. 4 is diagrammatic illustration of a layered coding scheme used by the content producer/provider to encode the video data.

As noted above, the video encoder 80 encodes the video data into multiple layers, such that some of the enhancement layers in a current frame are predicted from at least one lower quality layer in a reference frame that is not necessarily the base layer. There are many ways to implement this FPGS layered coding scheme. One example is illustrated in FIG. 4 for discussion purposes and to point out the advantages of the scheme. Other examples are illustrated below with reference to FIGS. 11-13.

FIG. 4 conceptually illustrates a PFGS layered coding scheme 100 implemented by the video encoder 80 of FIG. 3. The encoder 80 encodes frames of video data into multiple layers, including a base layer and multiple enhancement layers. For discussion purposes, FIG. 4 illustrates four layers: a base layer 102, a first layer 104, a second layer 106, and a third layer 108. The upper three layers 104-108 are enhancement layers to the base video layer 102. The term layer here refers to a spatial layer or SNR (quality layer) or both. Five consecutive frames are illustrated for discussion purposes.

The number of layers is not a fixed value, but instead is based on the residues of a transformation of the video data using, for example, a Discrete Cosine Transform (DCT). For instance, assume that the maximum residue is 24, which is represented in binary format with five bits "11000". Accordingly, for this maximum residue, there are five layers, including a base layer and four enhancement layers.

With coding scheme 100, higher quality layers are predicted from at least one lower quality layer, but not necessarily the base layer. In the illustrated example, except for the base-layer coding, the prediction of some enhancement layers in a prediction frame (P-frame) is based on a next lower layer of a reconstructed reference frame. Here, the even frames are predicted from the even layers of the preceding frame and the odd frames are predicted from the odd layers of the preceding frame. For instance, even frame 2 is predicted from the even layers of preceding frame 1 (i.e., base layer 102 and second layer 106). The layers of odd frame 3 are predicted from the odd layers of preceding frame 2 (i.e., the first layer 104 and the third layer 106). The layers of even frame 4 are once again predicted from the even layers of preceding frame 3. This alternating pattern continues throughout encoding of the video bitstream. In addition, the correlation between a lower layer and a next higher layer within the same frame can also be exploited to gain more coding efficiency.

The scheme illustrated in FIG. 4 is but one of many different coding schemes. It exemplifies a special case in a class of coding schemes that is generally represented by the following relationship:

$$L \bmod N = i \bmod M$$

where L designates the layer, N denotes a layer group depth, i designates the frame, and M denotes a frame group depth. Layer group depth defines how many layers may refer back to a common reference layer. Frame group depth refers to the number of frames that are grouped together for prediction purposes.

The relationship is used conditionally for changing reference layers in the coding scheme. If the equation is true, the layer is coded based on a lower reference layer in the preceding reconstructed frame.

The relationship for the coding scheme in FIG. 4 is a special case when both the layer and frame group depths are two. Thus, the relationship can be modified to L mod N=i mod N, because N=M. In this case where N=M=2, when frame i is 2 and layer L is 1 (i.e., first layer 104), the value L mod N does not equal that of i mod N, so the next lower reference layer (i.e., base layer 102) of the reconstructed reference frame 1 is used. When frame i is 2 and layer L is 2 (i.e., second layer 106), the value L mod N equals that of i mod N, so a higher layer (i.e., second enhancement layer 106) of the reference frame is used.

Generally speaking, for the case where N=M=2, this relationship holds that for even frames 2 and 4, the even layers (i.e., base layer 102 and second layer 106) of preceding frames 1 and 3, respectively, are used as reference; whereas, for odd frames 3 and 5, the odd layers (i.e., first layer 104 and third layer 108) of preceding frames 2 and 4, respectively, are used as reference.

The coding scheme affords high coding efficiency along with good error recovery. The proposed coding scheme is particularly beneficial when applied to video transmission over the Internet and wireless channels. One advantage is that the encoded bitstream can adapt to the available bandwidth of the channel without a drifting problem.

Figure 5:
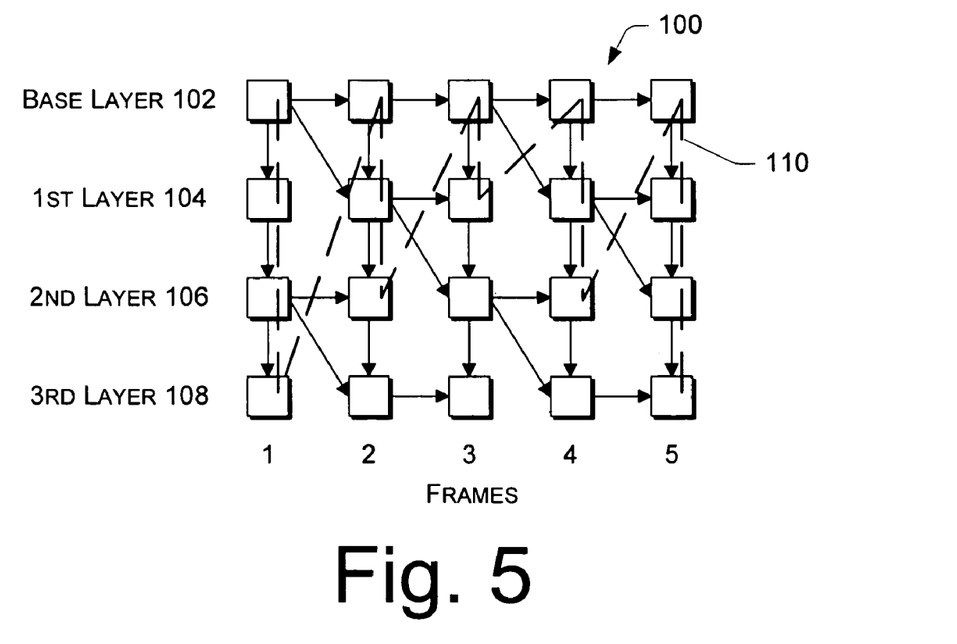
FIG. 5 is similar to FIG. 4 and further shows how the number of layers that are transmitted over a network can be dynamically changed according to bandwidth availability.

FIG. 5 shows an example of this bandwidth adaptation property for the same coding scheme 100 of FIG. 4. A dashed line 110 traces the transmitted video layers. At frames 2 and 3, there is a reduction in bandwidth, thereby limiting the amount of data that can be transmitted. At these two frames, the server simply drops the higher layer bits (i.e., the third layer 108 is dropped from frame 2 and the second and third layers 106 and 108 are dropped from frame 3). However after frame 3, the bandwidth increases again, and the server transmits more layers of video bits. By frame 5, the decoder at the client can once again obtain the highest quality video layer.

Figure 6:
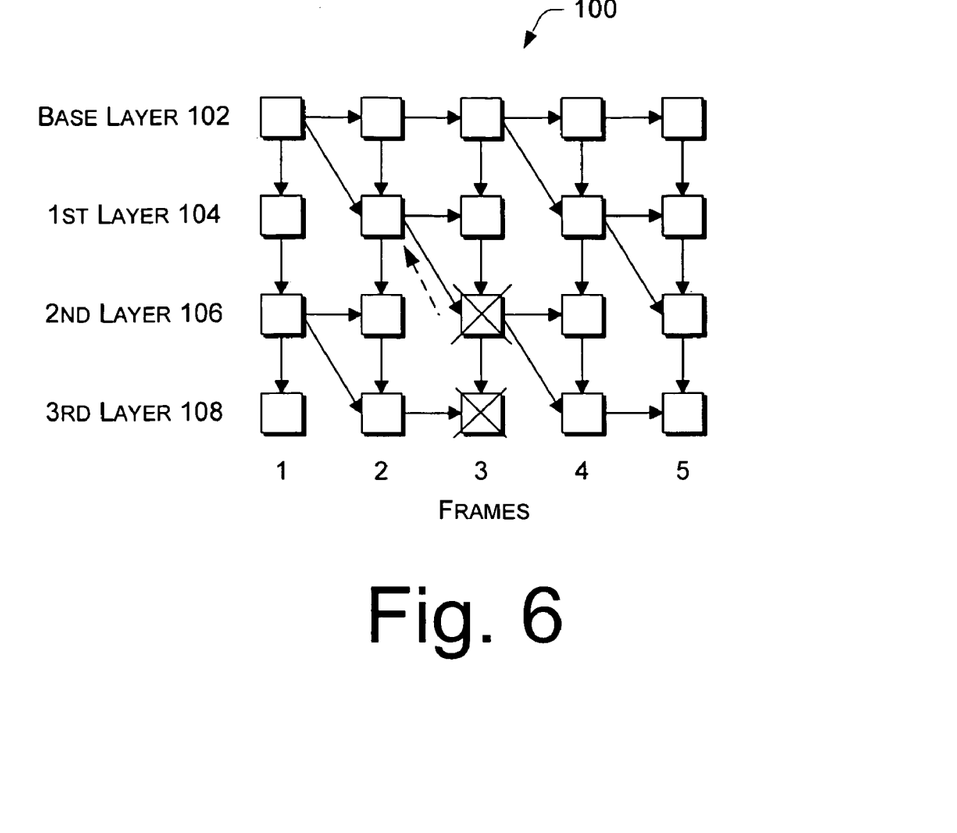
FIG. 6 is similar to FIG. 4 and further shows how missing or error-infested layers can be reconstructed from a reference layer in a reconstructed frame.

Another advantage is that higher video layers, which may not have successfully survived transmission or may have contained an error, may be recovered from lower layers. FIG. 6 shows an example in which the third and fourth layers of frame 3 are not correctly received at the receiving client. In this case, the third layer 106 of frame 3 may be reconstructed in part from the first layer 104 of preceding reference frame 2, as represented by the dashed arrow. As a result, there is no need for any re-encoding and re-transmission of the video bitstream. All layers of video are efficiently coded and embedded in a single bitstream.

Another advantage of the coding scheme is that it exhibits a very nice error resilience property when used for coding macroblocks. In error-prone networks (e.g., the Internet, wireless channel, etc.), packet loss or errors are likely to occur and sometimes quite often. How to gracefully recover from these packet losses or errors is a topic for much active research. With the layered coding scheme 100 of FIG. 4, it can be shown that as long as the base layer 102 does not have any packet loss or error, the packet losses/errors in the higher layers can always be gracefully recovered over a few frames without any re-transmission and drifting problem.

Figure 7:
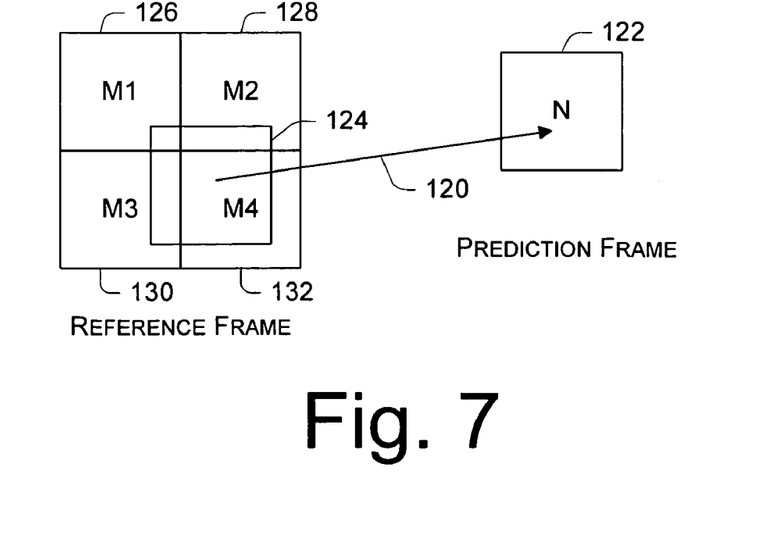
FIG. 7 is a diagrammatic illustration of a macroblock in a prediction frame predicted from a reference macroblock in a reference frame according to a motion vector.

FIG. 7 shows an example in which a motion vector 120 of a macroblock (MB) 122 in a prediction frame points to a reference macroblock 124 in a reference frame. The reference MB 124 does not necessarily align with the original MB boundary in the reference frame. In a worst case, the reference MB 124 consists of pixels from four neighboring MBs 126, 128, 130, and 132 in the reference frame.

Now, assume that some of the four neighboring MBs 126-132 have experienced packet loss or error, and each of them has been reconstructed to the maximum error free layer. For example, MBs 126-132 have been reconstructed at layers M1, M2, M3, and M4, respectively. The reference MB 124 is composed by pixels from the reconstructed four neighbor MBs 126-132 in the reference frame at a layer equal to the minimum of the reconstructed layers (i.e., min(M1,M2,M3,M4)). As a result, the MB 122 being decoded in the prediction frame is decoded at a maximum layer equal to:

$$1+\min(M1,M2,M3,M4)$$

As a result, no drifting error is introduced and an error-free frame is reconstructed over a few frames depending on the number of layers used by the encoder.

Figure 8:
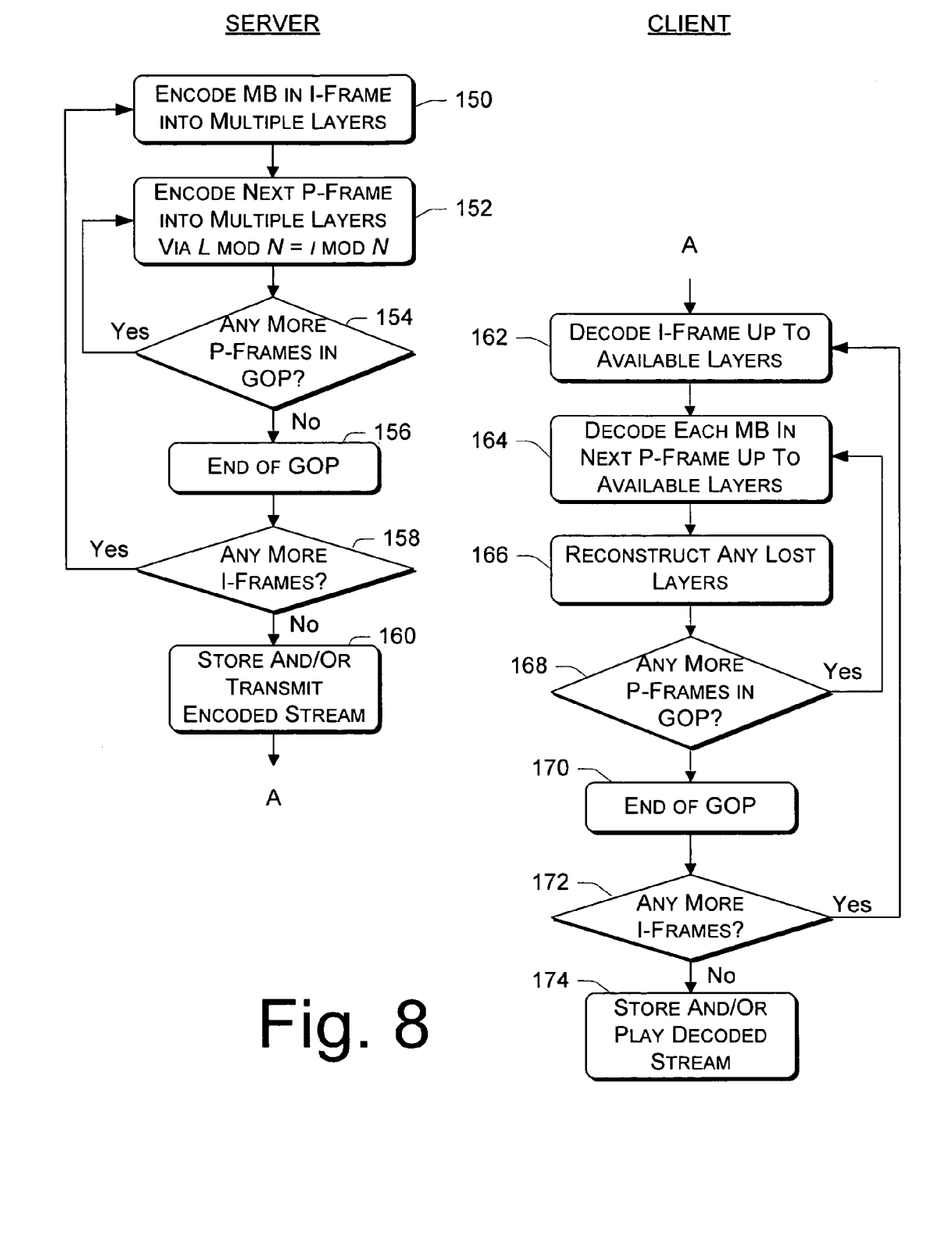
FIG. 8 is a flow diagram showing a method for encoding video data using the layered coding scheme illustrated in FIG. 4.

FIG. 8 shows a general layered coding process implemented at the server-side encoder 80 and client-side decoder 98. The process may be implemented in hardware and/or software. The process is described with reference to FIG. 3.

At step 150, the encoder 80 encodes each macroblock in a reference or intraframe (or "I-frame") into different layers. With reference to FIG. 4, suppose that frame 1 is an I-frame, and the encoder 80 forms the base and three enhancement layers 102-108. At step 152, the encoder 80 encodes each predicted frame (or "P-frame") into different layers. Suppose that frame 2 is a P-frame. The encoder 80 encodes the base layer 102 of frame 2 according to conventional techniques and encodes the enhancement layers 104-108 of frame 2 according to the relationship L mod N=i mod M.

At step 154, the encoder evaluates whether there are any more P-frames in the group of P-frames (GOP). If there are (i.e., the "yes" branch from step 154), the next P-frame is encoded in the same manner. Otherwise, all P-frames for a group have been encoded (step 156).

The process continues until all I-frames and P-frames have been encoded, as represented by the decision step 158. Thereafter, the encoded bitstream can be stored in its compressed format in video storage 70 and/or transmitted from server 74 over the network 64 to the client 66 (step 160). When transmitted, the server transmits the base layer within the allotted bandwidth to ensure delivery of the base layer. The server also transmits one or more enhancement layers according to bandwidth availability. As bandwidth fluctuates, the server transmits more or less of the enhancement layers to accommodate the changing network conditions.

The client 66 receives the transmission and the decoder 98 decodes the I-frame up to the available layer that successfully made the transmission (step 162). The decoder 98 next decodes each macroblock in each P-frame up to the available layers (step 164). If one or more layers were not received or contained errors, the decoder 98 attempts to reconstruct the layer(s) from the lower layers of the same or previous frame(s) (step 166). The decoder decodes all P-frames and I-frames in the encoded bitstream (steps 168-172). At step 174, the client stores and/or plays the decoded bitstream.

Exemplary Video Encoder

Figure 9:
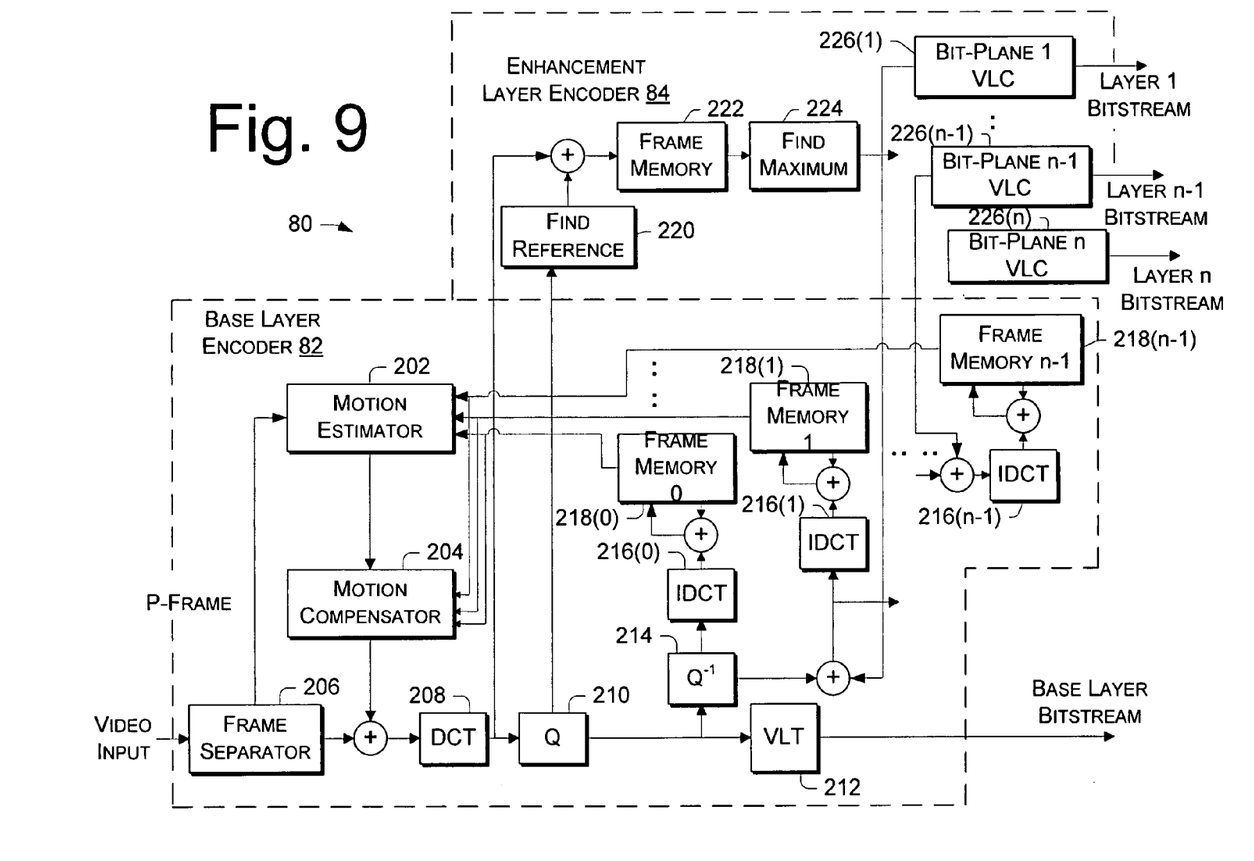
FIG. 9 is a block diagram of an exemplary video encoder implemented at the content producer/provider.

FIG. 9 shows an exemplary implementation of video encoder 80, which is used by server 74 to encode the video data files prior to distribution over the network 64 (FIG. 3). The video encoder 80 is configured to code video data according to the layered coding scheme illustrated in FIG. 4, where both the layer group depth N and the frame group depth M equal two.

Video encoder 80 has a base layer encoder 82 and an enhancement layer encoder 84, which are delineated by dashed boxes. It includes a frame separator 202 that receives the video data input stream and separates the video data into I-frames and P-frames. The P-frames are sent to a motion estimator 204 to estimate the movement of objects from locations in the I-frame to other locations in the P-frame. The motion estimator 204 also receives as reference for the current input, a previous reconstructed frame stored in frame memory 0 as well as reference layers with different SNR (signal-to-noise ratio) resolutions stored in frame memories 0 to n−1.

According to the coding scheme described above with respect to FIG. 4, the current layer is predicted from the next lower layer of a preceding reference reconstructed frame to make the motion prediction as accurate as possible. For example, enhancement layer j is predicted by layer j−1 of the reference reconstructed frame stored in frame memory j−1. The motion estimator 204 outputs its results to motion compensator 206. The motion estimator 204 and motion compensator 206 are well-known components used in conventional MPEG encoding.

In base layer coding, a displaced frame difference (DFD) between the current input and base layer of the reference reconstructed frame is divided into 8×8 blocks. A block k of the DFD image in the base layer at a time t is given as follows:

$$\Delta f_{t,0}(k) = \sum_{x \in block(k)} \sum_{y \in block(k)} \left\| f_t(x, y) - \hat{f}_{t-1,0}(x - \Delta x, y - \Delta y) \right\|$$

The result $\Delta f_{t,0}(k)$ is an 8×8 matrix whose element is a residue from motion compensation, f(x,y) is the original image at time t, and $f_{t-1,0}(x,y)$ is a base layer of the reference reconstructed image at time t−1. The vector ($\Delta x$, $\Delta y$) is a motion vector of block k referencing to $f_{t-1,0}(x,y)$.

The residual images after motion compensation are transformed by a DCT (Discrete Cosine Transform) module 208 and then quantified by a quantification function Q at module 210. The bitstream of the base layer is generated by summing the quantified DCT coefficients using a variable length table (VLT) 212, as follows:

$$B_0 = \sum_k VLT(Q(DCT(\Delta f_{t-1,0}(k))))$$

The base layers of the frames are also passed through an anti-quantified function $Q^{-1}$ at module 214. Accordingly, the DCT coefficients in the base layer are:

$$R_{t,0}(k) = Q_q^{-1}(Q_q(DCT(\Delta f_{t,0}(k))))$$

The result $R_{t,0}(k)$ is an 8×8 matrix, whose element is a DCT coefficient of $\Delta f_{t,0}(k)$. The DCT coefficients are passed to n frame memory stages. In all stages other than a base stage 0, the DCT coefficients are added to coefficients from the enhancement layer encoder 84. The coefficients are then passed through inverse DCT (IDCT) modules 216(0), 216(1), . . . , 216(n−1) and the results are stored in frame memories 218(0), 218(1), . . . , 218(n−1). The contents of the frame memories 218 are fed back to the motion estimator 204.

With base layer coding, the residues of block k in the DCT coefficient domain are:

$$\Delta R_{t,0}(k) = DCT(\Delta f_{t,0}(k)) - R_{t,0}(k)$$

The enhancement layer encoder 84 receives the original DCT coefficients output from DCT module 208 and the quantified DCT coefficients from Q module 210 and produces an enhancement bitstream. After taking residues of all DCT coefficients in an 8×8 block, the find reference module 220 forms run length symbols to represent the absolute values of the residue. The 64 absolute values of the residue block are arranged in a zigzag order into a one-dimensional array and stored in memory 222. A module 224 computes the maximum value of all absolute values as follows:

$$m = \max(\Delta R_{t,0}(k))$$

The minimum number of bits needed to represent the maximum value m in a binary format dictates the number of enhancement layers for each block. Here, there are n bit planes 226(1)-226(n) that are encode n enhancement layers using variable length coding (VLC).

The residual signal of block k of the DFD image in the enhancement layer at a time t is given as follows:

$$\Delta f_{t,i}(k) = \sum_{x \in block(k)} \sum_{y \in block(k)} \left\| f_t(x, y) - \hat{f}_{t-1,i-1}(x - \Delta x, y - \Delta y) \right\|$$

where $1 \leq i \leq n$. The encoding in the enhancement layer is as follows:

$$R_{t,i}(k) = 2^{n-i} \left[ DCT(\Delta f_{t,i}(k)) - \sum_{j=0}^{i-1} R_{t,j}(k) \right]_{2^{n-i}}$$

The bracketed operation [*] is modular arithmetic based on a modulo value of $2^{n-i}$. After encoding the enhancement layer i, the residues in DCT coefficient domain are:

$$\Delta R_{t,i}(k) = DCT(\Delta f_{t,i}(k)) - \sum_{j=0}^{i} R_{t,j}(k)$$

The bitstream generated in enhancement layer i is:

$$B_i = \sum_k VLT\left( \left[ DCT(\Delta f_{t,i}(k)) - \sum_{j=0}^{i} R_{t,j}(k) \right]_{2^{n-i}} \right)$$

At time t, the summary value of DCT coefficient of block k, which is encoded in based layer and enhancement layers, is:

$$sum(k) = \sum_{i=0}^{n} R_{t,j}(k)$$

Figure 10:
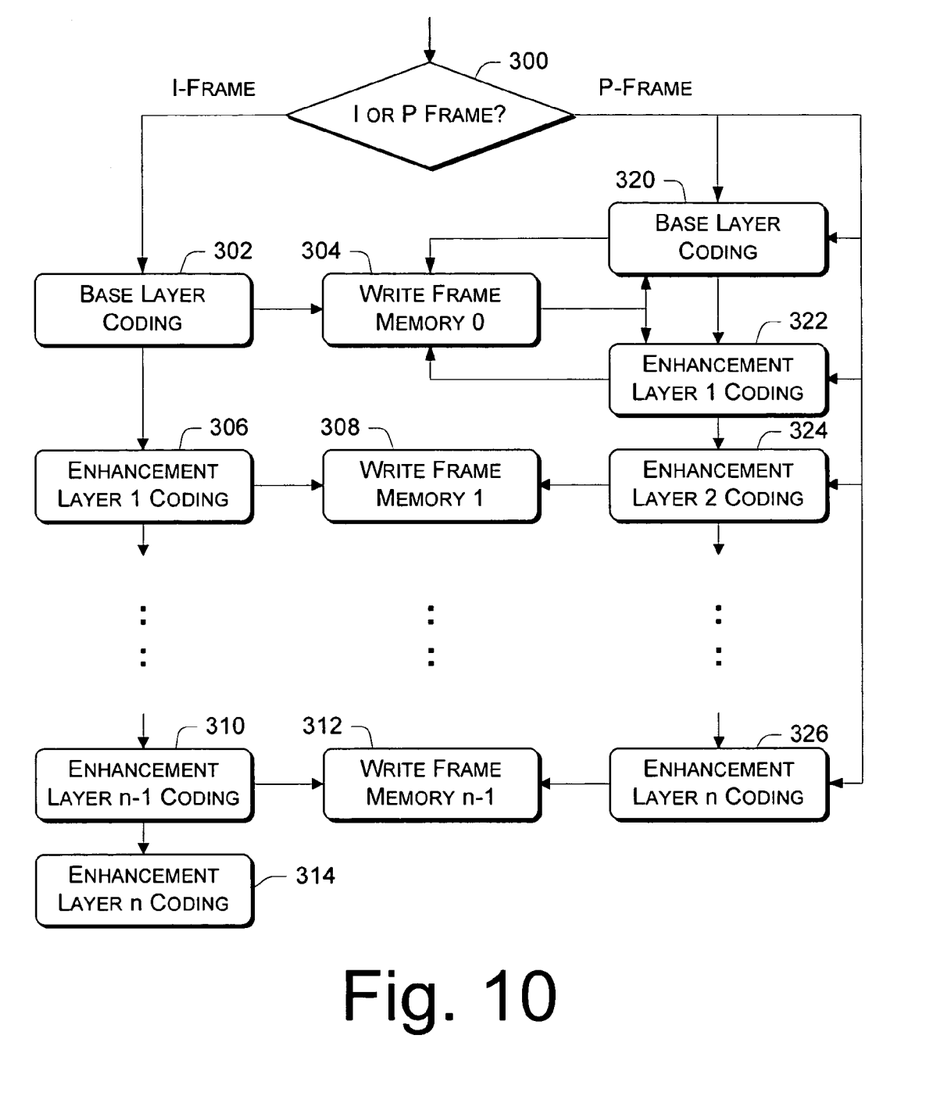
FIG. 10 is a flow diagram showing a method for encoding video data that is implemented by the video encoder of FIG. 10.

FIG. 10 shows an encoding process implemented by the video encoder of FIG. 9. At step 300, the video encoder distinguishes between an I-frame and a P-frame. For I-frame encoding, the video encoder generates the corresponding bitstream and updates the various frame memories 218(0)-218(n−1). For instance, the base layer is encoded and stored in frame memory 0 (steps 302 and 304). The enhancement layer 1 is coded and stored in frame memory 1 (steps 306 and 308). This continues for all enhancement layers 1 to n, with the coding results of enhancement layer n−1 being stored in frame memory n−1 (steps 310, 312, and 314).

For P-frame encoding, the video encoder performs motion compensation and transform coding. Both the base layer and first enhancement layer use the base layer in frame memory 0 as reference (steps 320 and 322). The coding results of these layers in the P-frame are also used to update the frame memory 0.

The remaining enhancement layers in a P-frame use the next lower layer as reference, as indicated by enhancement layer 2 being coded and used to update frame memory 1 (step 324) and enhancement layer n being coded and used to update frame memory n−1 (step 326).

It is noted that the encoder of FIG. 9 and the corresponding process of FIG. 10 depict n frame memories 218(0)-218(n−1) for purposes of describing the structure and clearly conveying how the layering is achieved. However, in implementation, the number of frame memories 218 can be reduced by almost one-half. In the coding scheme of FIG. 4, for even frames (e.g., frames 2 and 4), only the even layers of the previous frame (e.g., $2^{nd}$ layer 106 of frames 1 and 3) are used for prediction and not the odd layers. Accordingly, the encoder 80 need only store the even layers of the previous frame into frame memories for prediction. Similarly, for odd frames (e.g., frames 3 and 5), the odd layers of the previous frame (e.g., $1^{st}$ and $3^{rd}$ layers 102 and 108 of frames 2 and 4) are used for prediction and not the even layers. At that time, the encoder 80 stores only the odd layers into the frame memories for prediction. Thus, in practice, the encoder may be implemented with n/2 frame buffers to accommodate the alternating coding of the higher enhancement layers. In addition, the encoder employs one additional frame memory for the base layer. Accordingly, the total number of frame memories required to implement the coding scheme of FIG. 4 is (n+1)/2.

Alternative Coding Schemes

The PFGS layered coding scheme described above represents one special case of a coding scheme that follows the L mod N=i mod M relationship. Changing the layer group depth L and the frame group depth M result in other coding schemes within this class.

Figure 11:
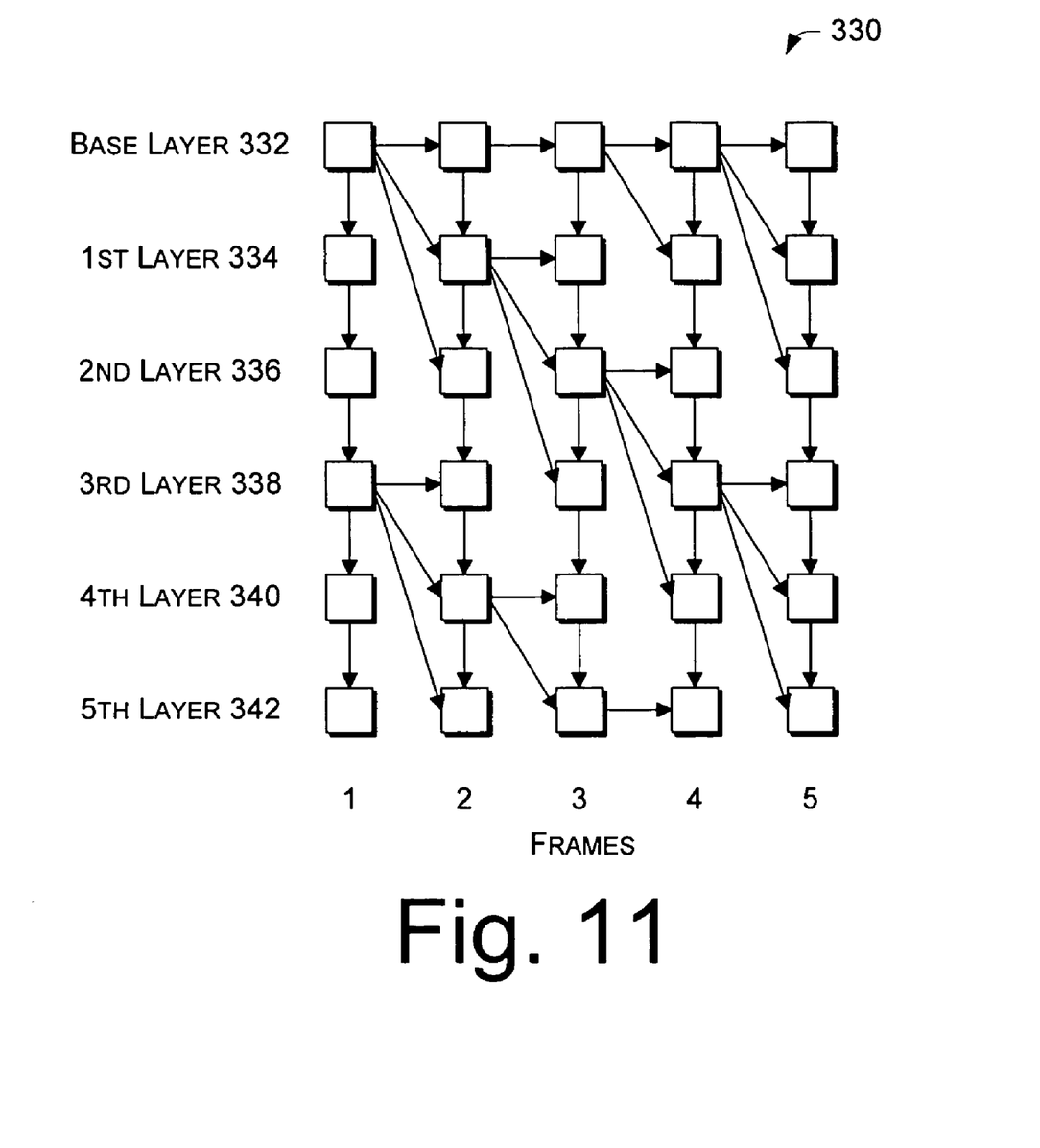
FIGS. 11-13 are diagrammatic illustrations of other layered coding scheme that may be used by the content producer/provider to encode the video data.

FIG. 11 illustrates another example of a PFGS layered coding scheme 330 from the class of schemes that follows the L mod N=i mod M. This scheme may be implemented by the video encoder 80 of FIG. 3.

In this illustration, the encoder 80 encodes frames of video data into six layers, including a base layer 332, a first layer 334, a second layer 336, a third layer 338, a fourth layer 340, and a fifth layer 342. Five consecutive frames are illustrated for discussion purposes.

Coding scheme 330 differs from coding scheme 100 in that the layer group depth N is three, rather than two, and frame group depth M remains at two. For layer 1 (i.e., first layer 334) of frame 2 in FIG. 11, the relationship L mod N=i mod M is false and hence a lower layer (i.e., base layer 332) of the reference reconstructed frame 1 is used. For layer 2 (i.e., second layer 336) of frame 2, the equation L mod N=i mod M is also false. Thus, the lower base layer 332 of frame 1 is again used as reference. For layer 3 (i.e., third layer 338) of frame 2, the relationship holds true, and thus a higher enhancement layer 3 (i.e., the third layer 338) in the reference reconstructed frame 1 is used.

Accordingly, in this example, every third layer acts as a reference for predicting layers in the succeeding frame. For example, the first and second layers of frames 2 and 5 are predicted from the base layer of respective reference frames 1 and 4. The third through fifth layers of frames 2 and 5 are predicted from the third layer of reference frames 1 and 4, respectively. Similarly, the first through third layers of frame 3 are predicted from the first layer of preceding reference frame 2. The second through fourth layers of frame 4 are predicted from the second layer of preceding reference frame 3. This pattern continues throughout encoding of the video bitstream.

In addition to the class of coding schemes that follow the relationship L mod N=i mod M, the encoder 80 may implement other coding schemes in which the current frame is predicted from at least one lower quality layer that is not necessarily the base layer.

Figure 12:
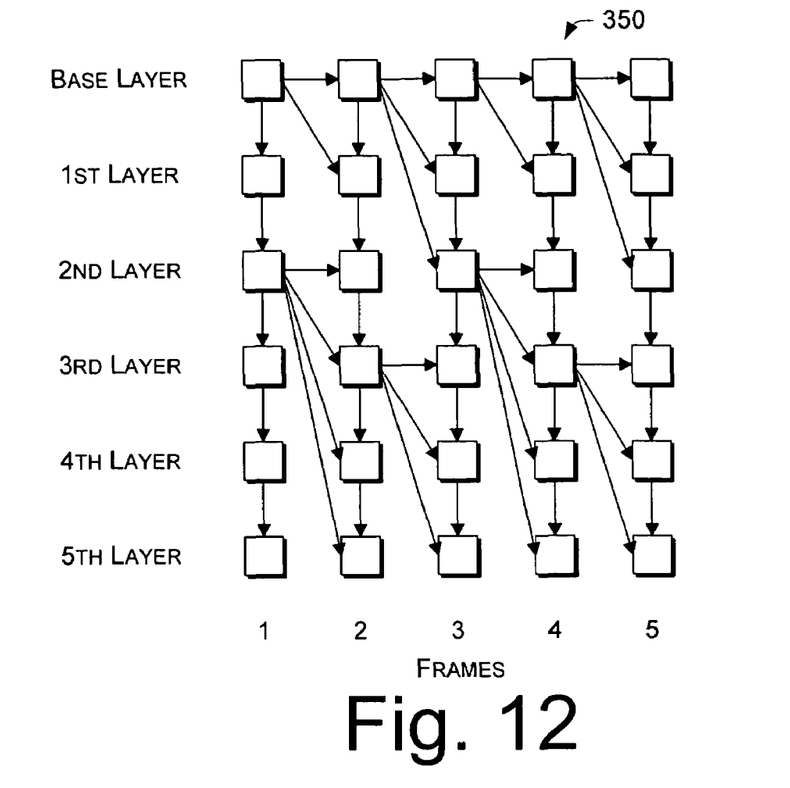

FIG. 12 shows another example of a PFGS layered coding scheme 350. Here, even frames 2 and 4 are predicted from the base and second layer of preceding frames 1 and 3, respectively. Odd frames 3 and 5 are predicted from the base and third layer of preceding frames 2 and 4, respectively.

Figure 13:
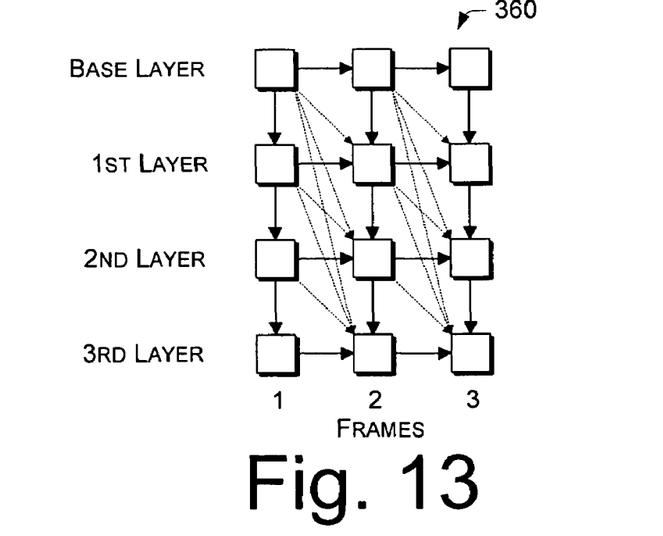

FIG. 13 shows another example of a PFGS layered coding scheme 360. In this scheme, each layer in the current frame is predicted from all lower quality layers in the previous frame.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system for coding video data according to layered coding techniques in which the video data is represented as multi-layered frames, each frame having multiple layers ranging from a base layer of low quality to enhancement layers of increasingly higher quality, the system comprising:
   means for forming a base layer for frames in the video data; and
   means for forming multiple enhancement layers for the frames by (1) predicting even frames from even enhancement layers, but not odd enhancement layers, of preceding odd frames and (2) predicting odd frames from odd enhancement layers, but not even enhancement layers, of preceding even frames.

2. A system as recited in claim 1, further comprising means for storing the base layer and the enhancement layers in memory.

3. A system as recited in claim 1, further comprising:
   means for transmitting the base layer over a network; and
   means for transmitting one or more of the enhancement layers over the network according to bandwidth availability on the network.

4. A system as recited in claim 1, further comprising means for recovering the video data from the base layer and any enhancement layer.

5. A system as recited in claim 4, further comprising means for reconstructing a missing enhancement layer from an enhancement layer of a reference reconstructed frame.

6. A system for coding video data according to layered coding techniques in which the video data is represented as multi-layered frames, each frame having multiple layers ranging from a base layer of low quality to enhancement layers of increasingly higher quality, the system comprising:
   means for forming a base layer for frames in the video data; and
   means for forming at least first, second, and third enhancement layers by (1) predicting even frames from the base layer and the second enhancement layer, but not the first enhancement layer or the third enhancement layer, of preceding odd frames and (2) predicting odd frames from the base layer and the third enhancement layer, but not the second enhancement layer, of preceding even frames.

7. A system as recited in claim 6, further comprising means for storing the base layer and the enhancement layers in memory.

8. A system as recited in claim 6, further comprising:
means for transmitting the base layer over a network; and
means for transmitting one or more of the enhancement layers over the network according to bandwidth availability on the network.

9. A system as recited in claim 6, further comprising means for recovering the video data from the base layer and any enhancement layer.

10. A system as recited in claim 9, further comprising means for reconstructing a missing enhancement layer from an enhancement layer of a reference reconstructed frame.

11. A system for coding video data, comprising:
means for encoding frames of the video data into a base layer of low quality; and
means for encoding the frames of the video data into multiple enhancement layers of increasingly higher quality such that the enhancement layers of even frames are predicted from even layers, but not odd layers, of preceding odd frames and the enhancement layers of odd frames are predicted from odd layers, but not even layers, of preceding even frames.

12. A system as recited in claim 11, further comprising means for storing the base layer and the enhancement layers in memory.

13. A system as recited in claim 11, further comprising:
means for transmitting the base layer over a network; and
means for transmitting one or more of the enhancement layers over the network according to bandwidth availability on the network.

14. A system as recited in claim 11, further comprising means for decoding the base layer and the one or more enhancement layers into the video data.

15. A system as recited in claim 14, further comprising means for reconstructing a missing enhancement layer from an enhancement layer of a reference reconstructed frame.

* * * * *